(12) United States Patent
Herbst et al.

(10) Patent No.: US 7,404,736 B2
(45) Date of Patent: Jul. 29, 2008

(54) PATCH PANEL AND STRAIN RELIEF BAR ASSEMBLY

(75) Inventors: Paul M. Herbst, Frankfort, IL (US); Jeremy S. Parrish, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/317,695

(22) Filed: Dec. 23, 2005

(65) Prior Publication Data

US 2006/0160431 A1 Jul. 20, 2006

Related U.S. Application Data

(60) Provisional application No. 60/640,935, filed on Dec. 30, 2004.

(51) Int. Cl.
*H01R 13/74* (2006.01)

(52) U.S. Cl. ..................................... 439/557

(58) Field of Classification Search .............. 439/540.1, 439/557, 719; 211/26; 174/72 A, 135; 361/826, 361/683; 160/39, 38
See application file for complete search history.

(56) References Cited

U.S. PATENT DOCUMENTS

| | | | |
|---|---|---|---|
| 5,401,193 A | 3/1995 | Lo Cicero et al. | |
| 5,575,665 A | 11/1996 | Shramawick et al. | |
| 5,836,786 A | 11/1998 | Pepe | |
| 5,918,837 A | 7/1999 | Vicain | |
| 5,975,962 A | 11/1999 | Laukonis | |
| 6,077,113 A | 6/2000 | Lecomte | |
| 6,086,415 A | 7/2000 | Sanchez et al. | |
| 6,170,784 B1 | 1/2001 | MacDonald et al. | |
| 6,215,064 B1 | 4/2001 | Noble et al. | |
| 6,245,998 B1 | 6/2001 | Curry et al. | |
| 6,285,565 B1 | 9/2001 | Åberg et al. | |
| 6,347,715 B1 * | 2/2002 | Drozdenko et al. | ........... 211/26 |
| 6,373,721 B2 | 4/2002 | Lecinski et al. | |
| 6,396,992 B1 | 5/2002 | Debal | |
| 6,445,865 B1 | 9/2002 | Janus et al. | |
| 6,522,551 B2 | 2/2003 | Hsu et al. | |
| 6,568,542 B1 * | 5/2003 | Chen | ........................... 211/26 |
| 6,590,785 B1 | 7/2003 | Lima et al. | |
| 6,600,106 B2 | 7/2003 | Standish et al. | |
| 6,679,722 B1 | 1/2004 | Pulizzi | |
| 6,686,541 B2 | 2/2004 | Chan | |
| 6,742,746 B1 | 6/2004 | La Scola et al. | |
| 6,818,834 B1 | 11/2004 | Lin | |
| 7,091,418 B1 * | 8/2006 | Clark et al. | ............... 174/72 A |
| 2003/0022552 A1 | 1/2003 | Barker et al. | |
| 2003/0092314 A1 | 5/2003 | Whiteside et al. | |
| 2004/0182798 A1 | 9/2004 | Williams | |

* cited by examiner

*Primary Examiner*—Alexander Gilman
(74) *Attorney, Agent, or Firm*—Robert A. McCann; Christopher S. Clancy; James H. Williams

(57) ABSTRACT

A patch panel and strain relief bar assembly includes a patch panel, two bracket assemblies connected to the patch panel and a strain relief bar connected to the bracket assemblies. Each bracket assembly includes a first bracket and a second bracket removably secured to the first bracket. The first bracket is connected to the patch panel, and the first bracket has a tab including a cantilever that secures the first bracket to the second bracket. The first bracket also includes two roll-over edges connected to the tab. The second bracket is connected to the strain relief bar, and the second bracket has a tab including an aperture that receives a portion of the first bracket therein.

20 Claims, 9 Drawing Sheets

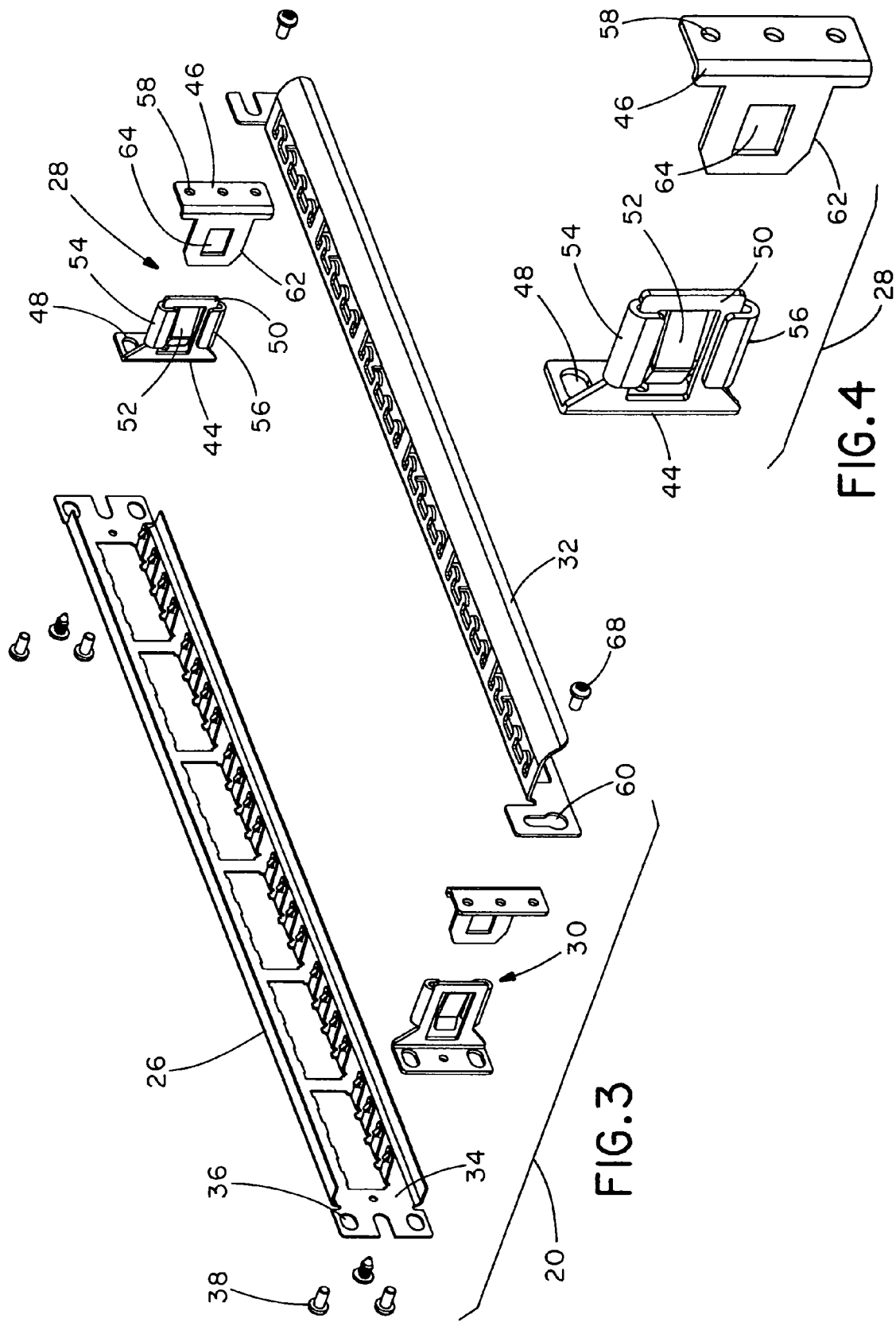

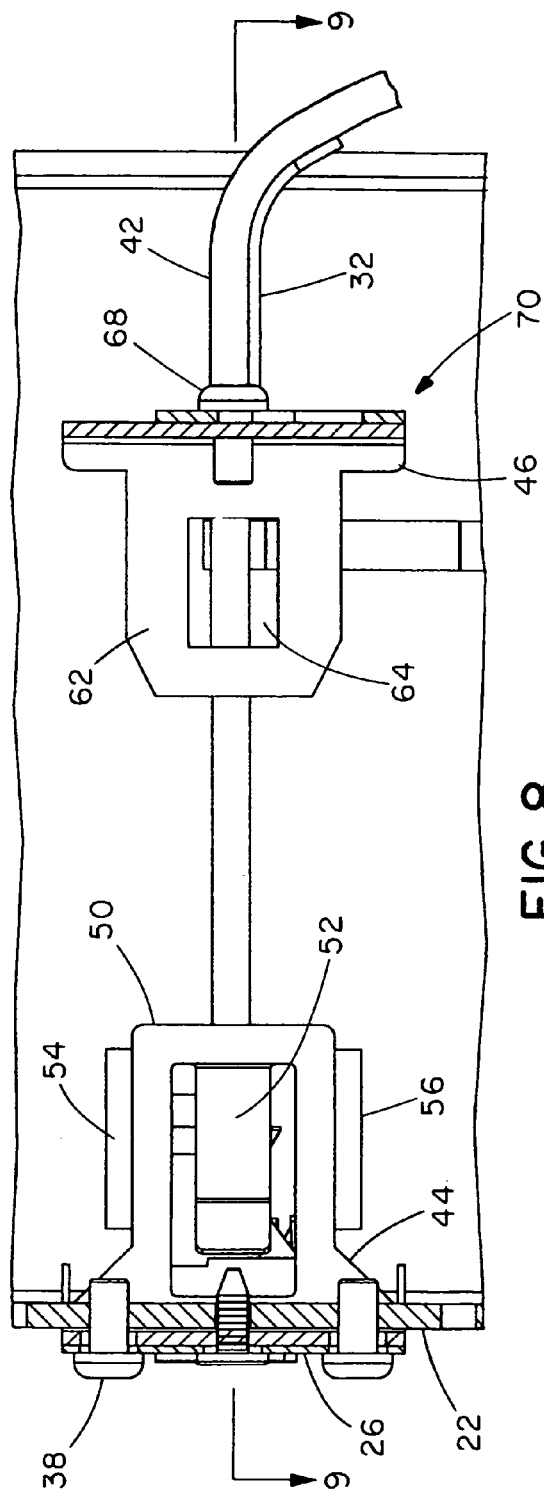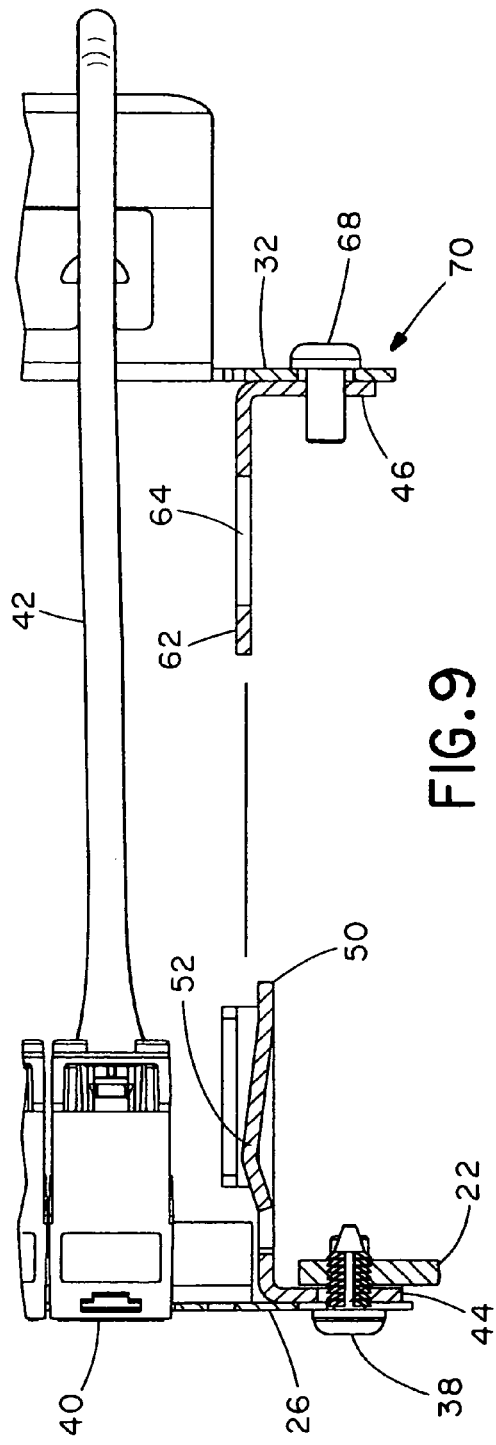

PATCH PANEL AND STRAIN RELIEF BAR ASSEMBLY

CROSS-REFERENCE TO RELATED APPLICATIONS

This application claims priority to Provisional Application Ser. No. 60/640,935, filed Dec. 30, 2004, the entirety of which is hereby incorporated by reference.

BACKGROUND OF THE INVENTION

The present invention is directed to a patch panel and strain relief bar assembly and, more particularly, to quick release brackets for removably securing a strain relief bar to a patch panel.

U.S. Pat. No. 6,818,834 discloses two mounting elements used to secure a strain relief bar to the rear side of a patch panel with threaded screws. Moreover, U.S. Pat. No. 6,568,542 discloses two anchor elements used to secure a strain relief bar to the rear side of a patch panel. However, neither of these prior art patents disclose quick release brackets for removably securing a strain relief bar assembly to a patch panel.

SUMMARY OF THE INVENTION

It would be desirable to provide quick release brackets that allow a strain relief bar to be removed from a patch panel for easy moves, adds and changes.

It would also be desirable to provide quick release brackets that allow a strain relief bar to be removed from a patch panel without using tools.

A patch panel and strain relief bar assembly includes a patch panel, two bracket assemblies connected to the patch panel and a strain relief bar connected to the bracket assemblies. Each bracket assembly includes a first bracket and a second bracket removably secured to the first bracket. The first bracket is connected to the patch panel, and the first bracket has a tab including a cantilever that secures the first bracket to the second bracket. The first bracket also includes two rollover edges connected to the tab. The second bracket is connected to the strain relief bar, and the second bracket has a tab including an aperture that receives a portion of the first bracket therein.

Preferably, the first bracket is mounted between the patch panel and the rack.

Preferably, the strain relief bar supports cable exiting from a rear side of the patch panel, and a cable tie secures the cable to the strain relief bar.

BRIEF DESCRIPTION OF THE FIGURES

FIG. 3 is an exploded rear perspective view of the assembly of FIG. 2, shown with the connectors removed from the patch panel;

FIG. 4 is an exploded rear perspective view of a quick release bracket shown in FIG. 3;

FIG. 8 is a cross-sectional view taken along lines 8-8 of FIG. 7;

FIG. 9 is a cross-sectional view taken along lines 9-9 of FIG. 8;

DETAILED DESCRIPTION OF PREFERRED EMBODIMENTS

Figure 1:
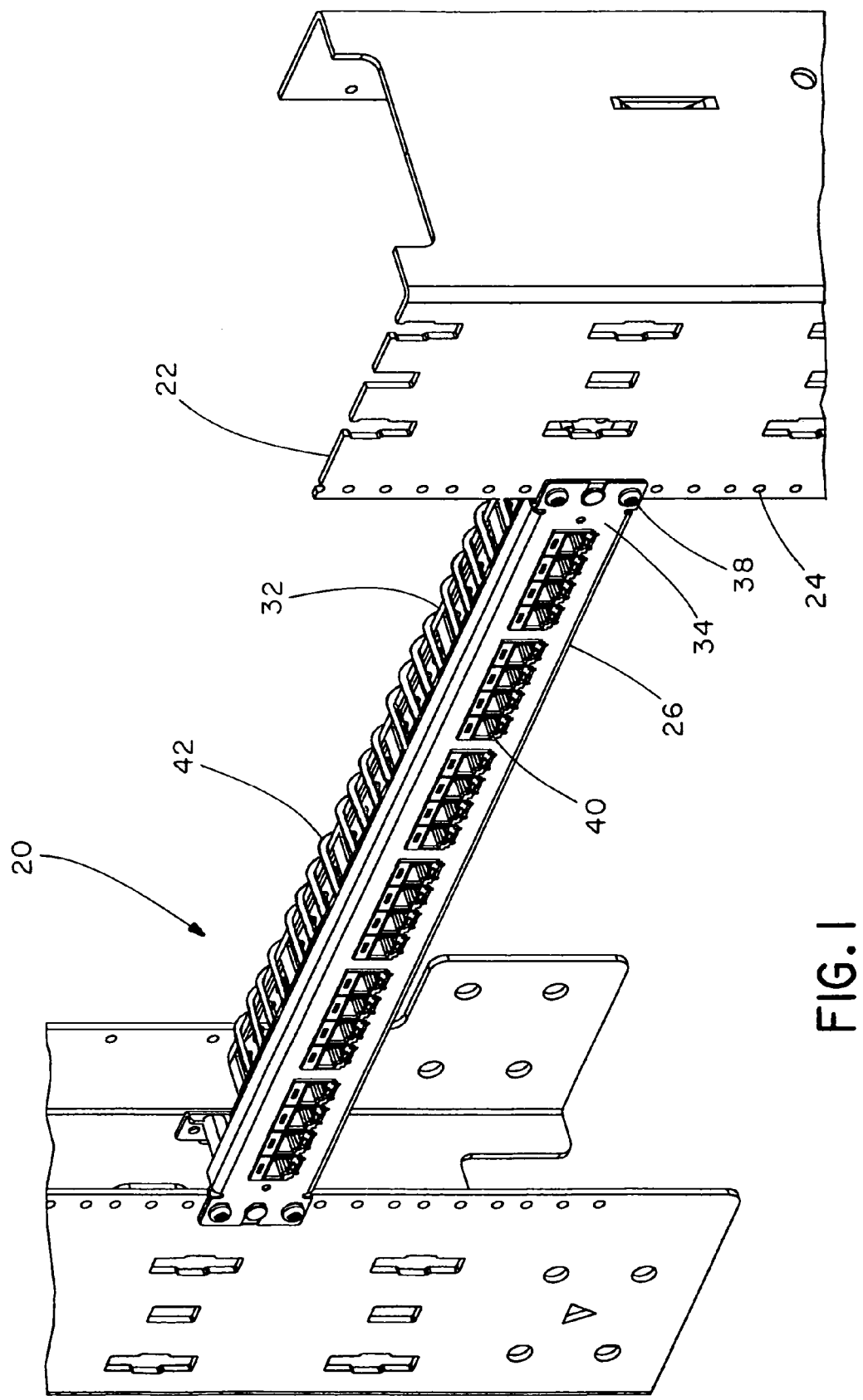
FIG. 1 is a front perspective view of a patch panel and strain relief bar assembly according to the present invention.

FIGS. 1-13 illustrate a patch panel and strain relief bar assembly 20 for use on either a rack cabinet or an open-frame rack, such as rack 22. As best seen in FIG. 1, rack 22 has equidistantly-spaced mounting holes 24 positioned vertically therealong. As shown in FIG. 3, assembly 20 includes patch panel 26, quick release brackets 28, 30 which attach to rack 22, and strain relief bar 32.

Figure 2:
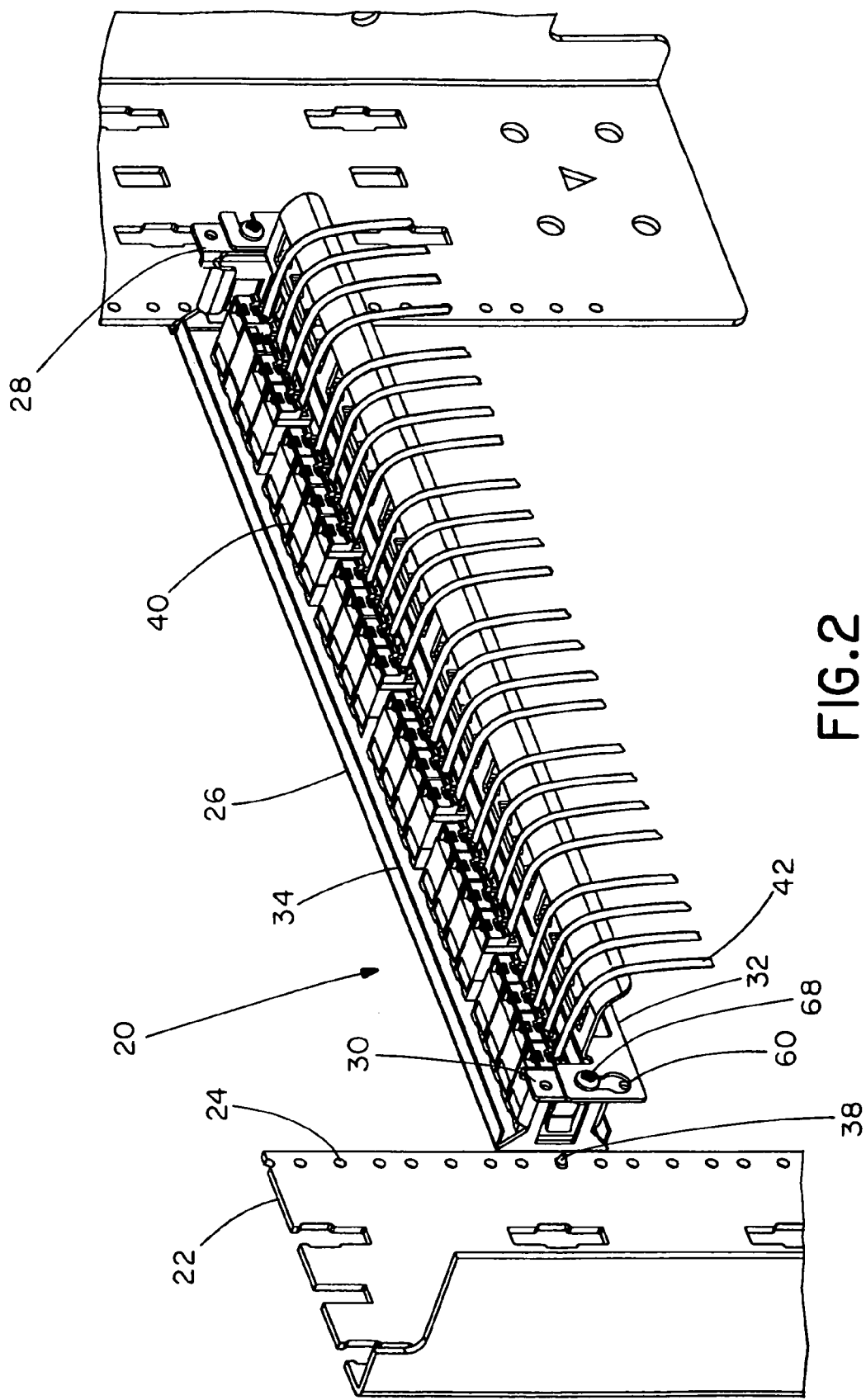
FIG. 2 is a rear perspective view of the assembly of FIG. 1.

Patch panel 26 includes a frame 34 having mounting holes 36 at each end for securing patch panel 26 to the front side of rack 22 using screws 38. Frame 34 also includes connectors 40 having cable 42 exiting from the rear side thereof, as shown in FIG. 2. As best seen in FIG. 1, frame mounting holes 36 align with rack mounting holes 24, and screws 38 are used to secure patch panel 26 to rack 22.

Bracket 28 and bracket 30 are universal. That is, bracket 28 can be flipped over and used as bracket 30 on the other side of rack 22, and vice versa. Accordingly, bracket 28 will be described below, with the understanding that bracket 30 is identical and functions identically.

Figure 10:
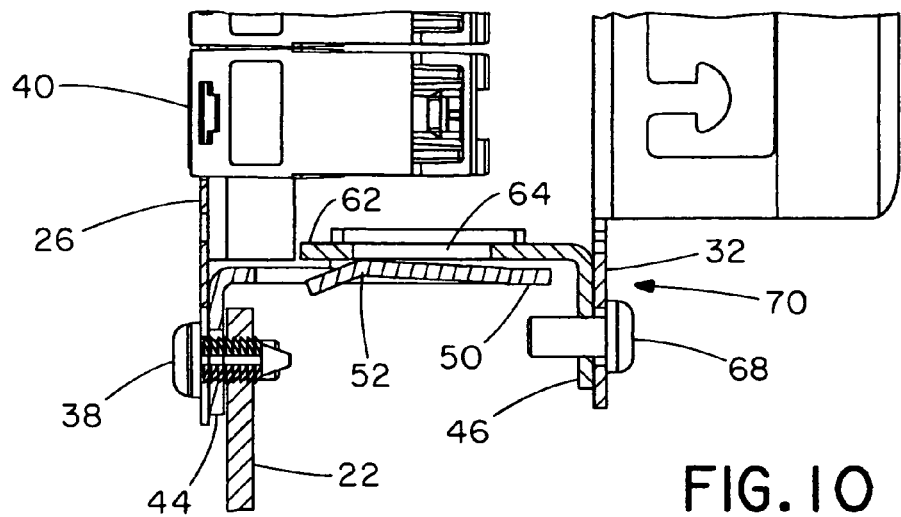
FIG. 10 is a cross-sectional view similar to FIG. 9, shown as the strain relief bar assembly is secured to the patch panel.
Figure 11:
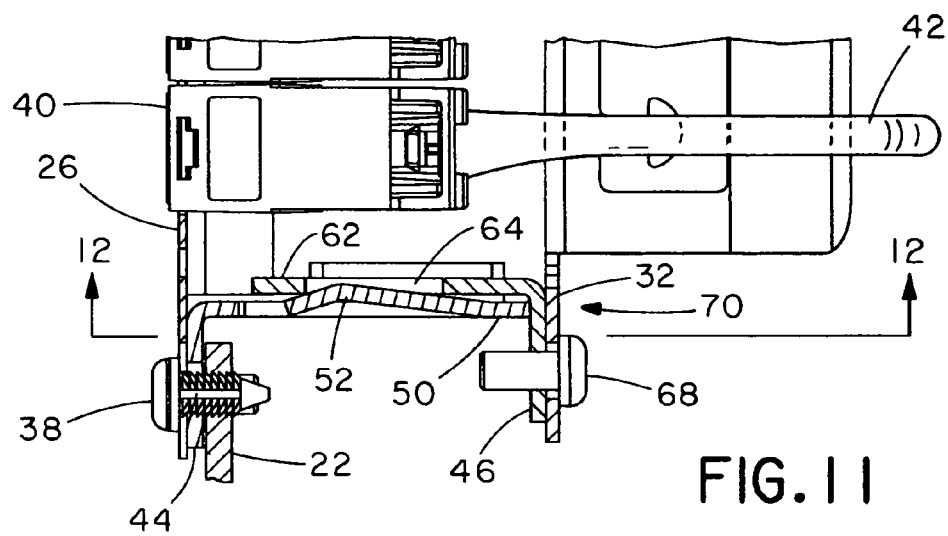
FIG. 11 is a cross-sectional view similar to FIG. 9, shown after the strain relief bar assembly is secured to the patch panel.

As best seen in FIG. 4, bracket 28 includes a latching bracket 44 and a tab bracket 46. Latching bracket 44 has mounting holes 48 which align with frame mounting holes 36 and rack mounting holes 24, and latching bracket 44 is secured to the front side of rack 22 using screws 38. Latching bracket 44 is attached between patch panel 26 and rack 22, sandwiching all the parts together as shown in FIGS. 9-11. Latching bracket 44 also has a tab 50 including a cantilever 52 and two rollover edges 54, 56 for securing latching bracket 44 to tab bracket 46.

Figure 5:
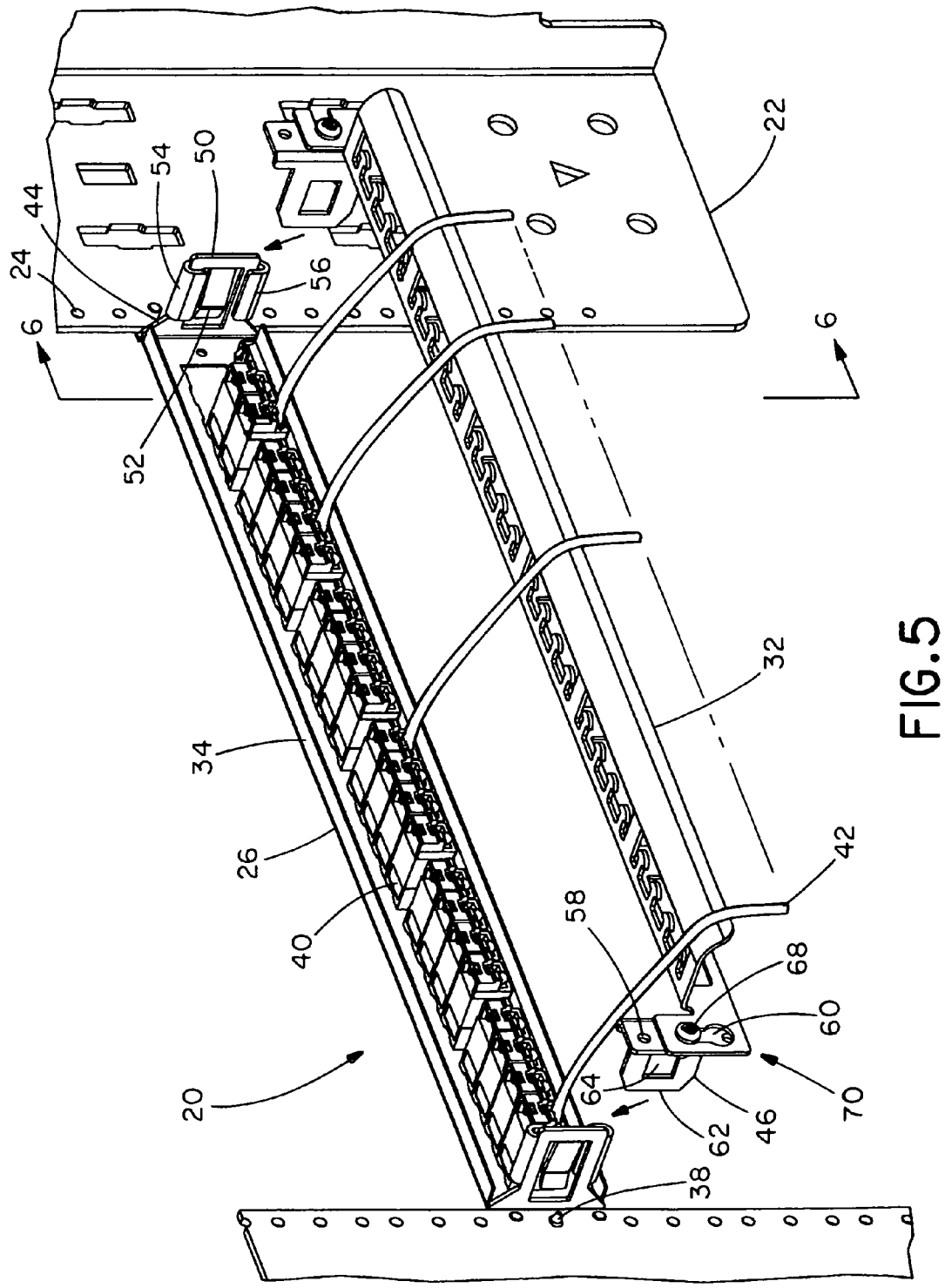
FIG. 5 is a rear perspective view of the assembly of FIG. 2, shown prior to securing the strain relief bar assembly to the patch panel.
Figure 12:
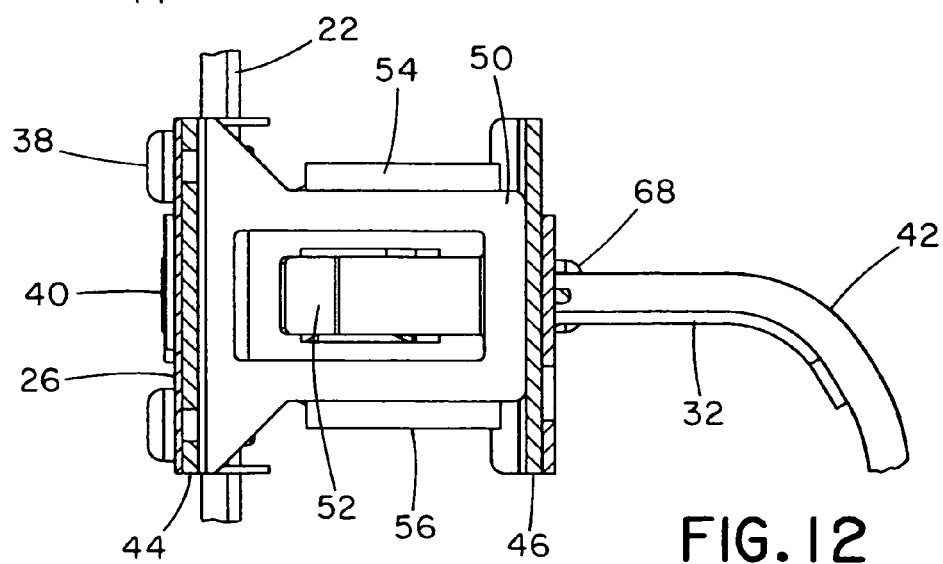
FIG. 12 is a cross-sectional view taken along lines 12-12 of FIG. 11.
Figure 13:
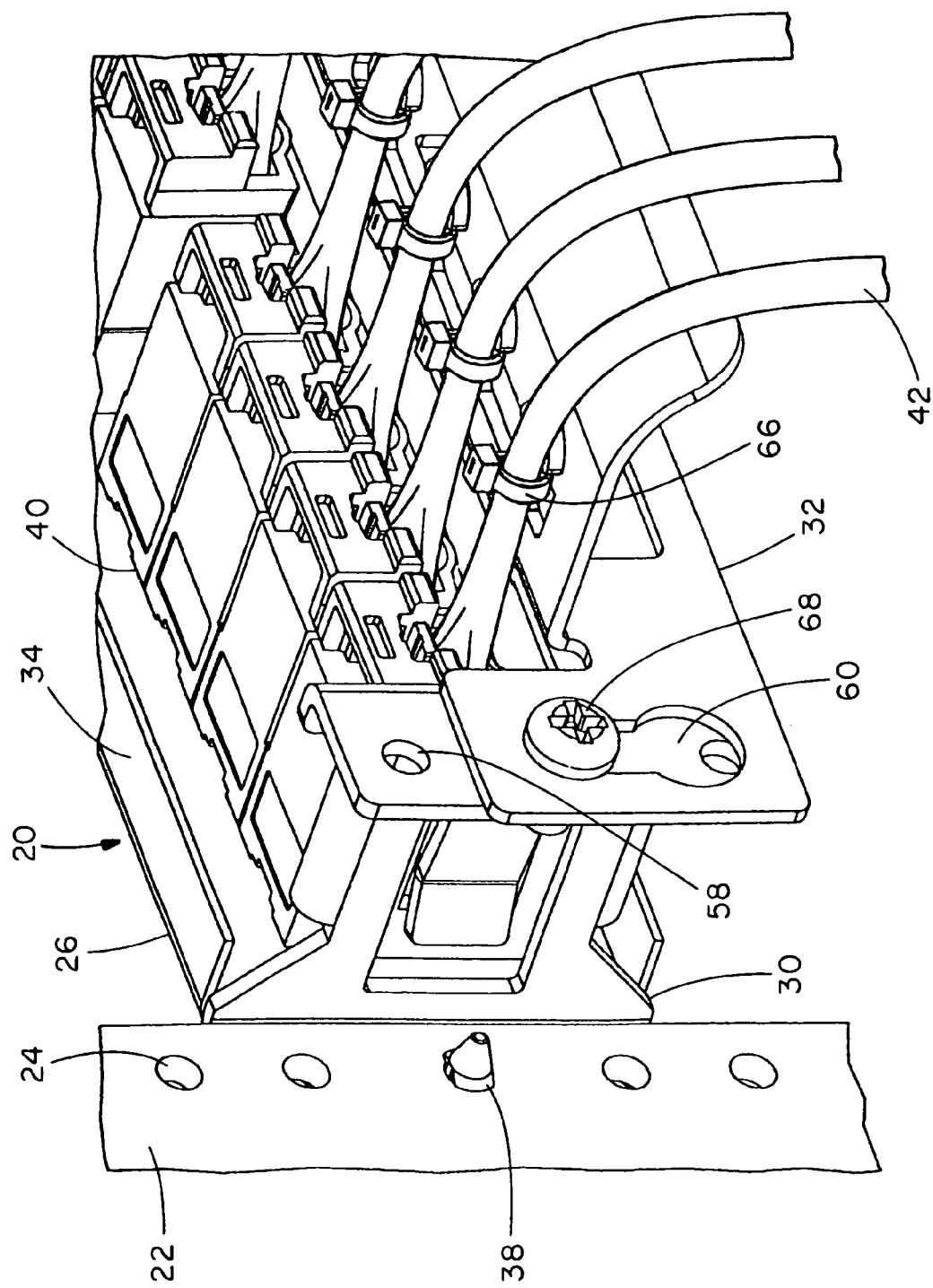
FIG. 13 is an enlarged rear perspective view of the assembly of FIG. 2.

Tab bracket 46 has mounting holes 58 that align with strain relief bar mounting holes 60 to secure tab bracket 46 to strain relief bar 32, as shown in FIG. 5. Tab bracket 46 also has a tab 62 including an aperture 64 for receiving cantilever 52 therein, as best seen in FIGS. 11 and 12. Tab 62 allows strain relief bar 32 to be secured to latching bracket 44 and then removed, if needed. Strain relief bar 32 supports cable 42 exiting from the back side of patch panel 26 to assist in cable management. Moreover, as best seen in FIG. 13, a fastener, such as cable tie 66, may be used to secure cable 42 to strain relief bar 32.

In operation, latching bracket mounting holes 48 are aligned with frame mounting holes 36, and screws 38 secure patch panel 26 and latching bracket 44 to the front side of rack 22. Next, strain relief bar 32 is secured to tab bracket 46 using screws 68 to form strain relief bar assembly 70. As shown in FIG. 5, screw 68 secures strain relief bar 32 to tab bracket 46 in the middle mounting hole 58 on tab bracket 46. However, it is likewise contemplated that strain relief bar 32 may be secured to tab bracket 46 at either of the other two holes 58 shown therein.

Figure 6:
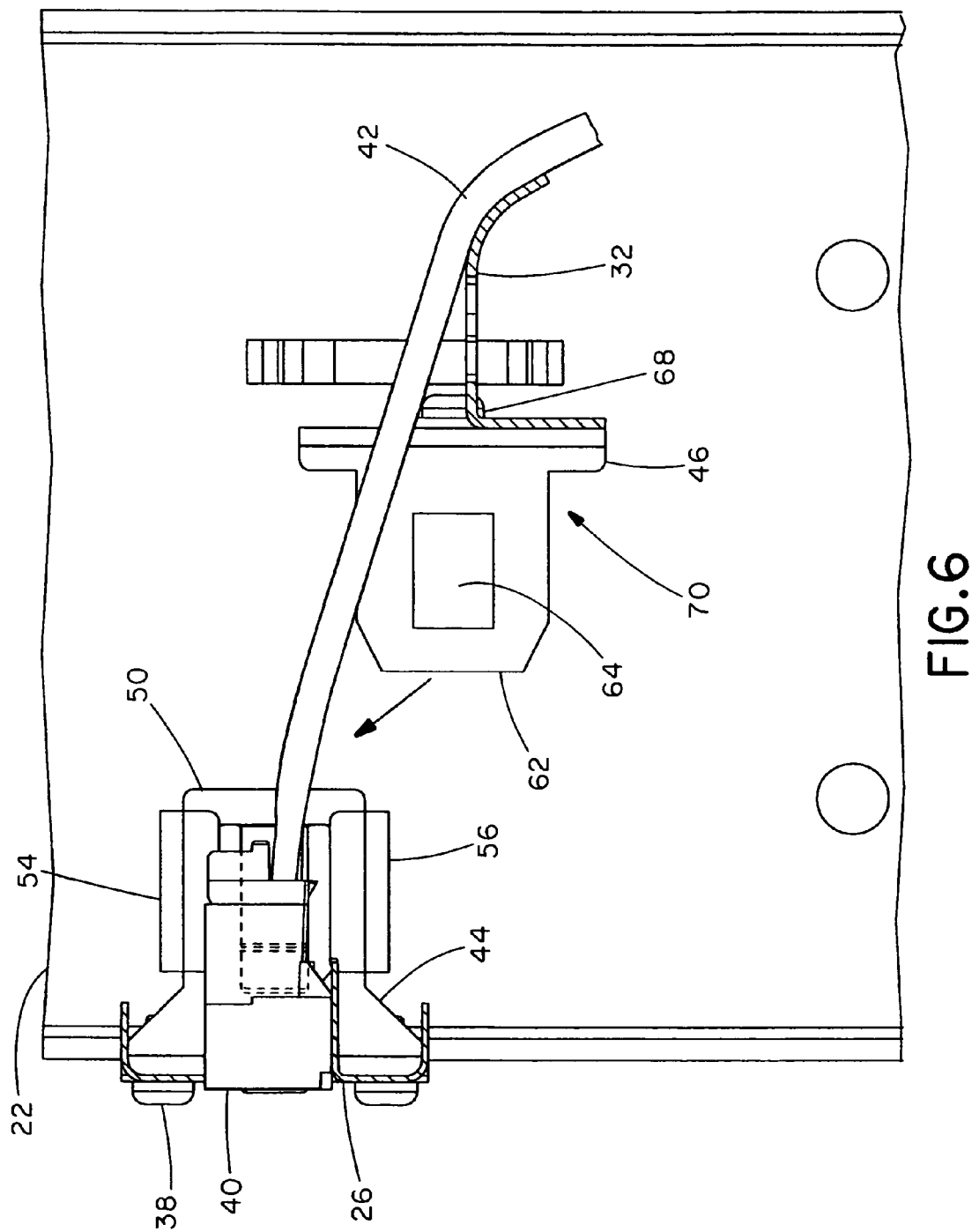
FIG. 6 is a cross-sectional view taken along lines 6-6 of FIG. 5.
Figure 7:
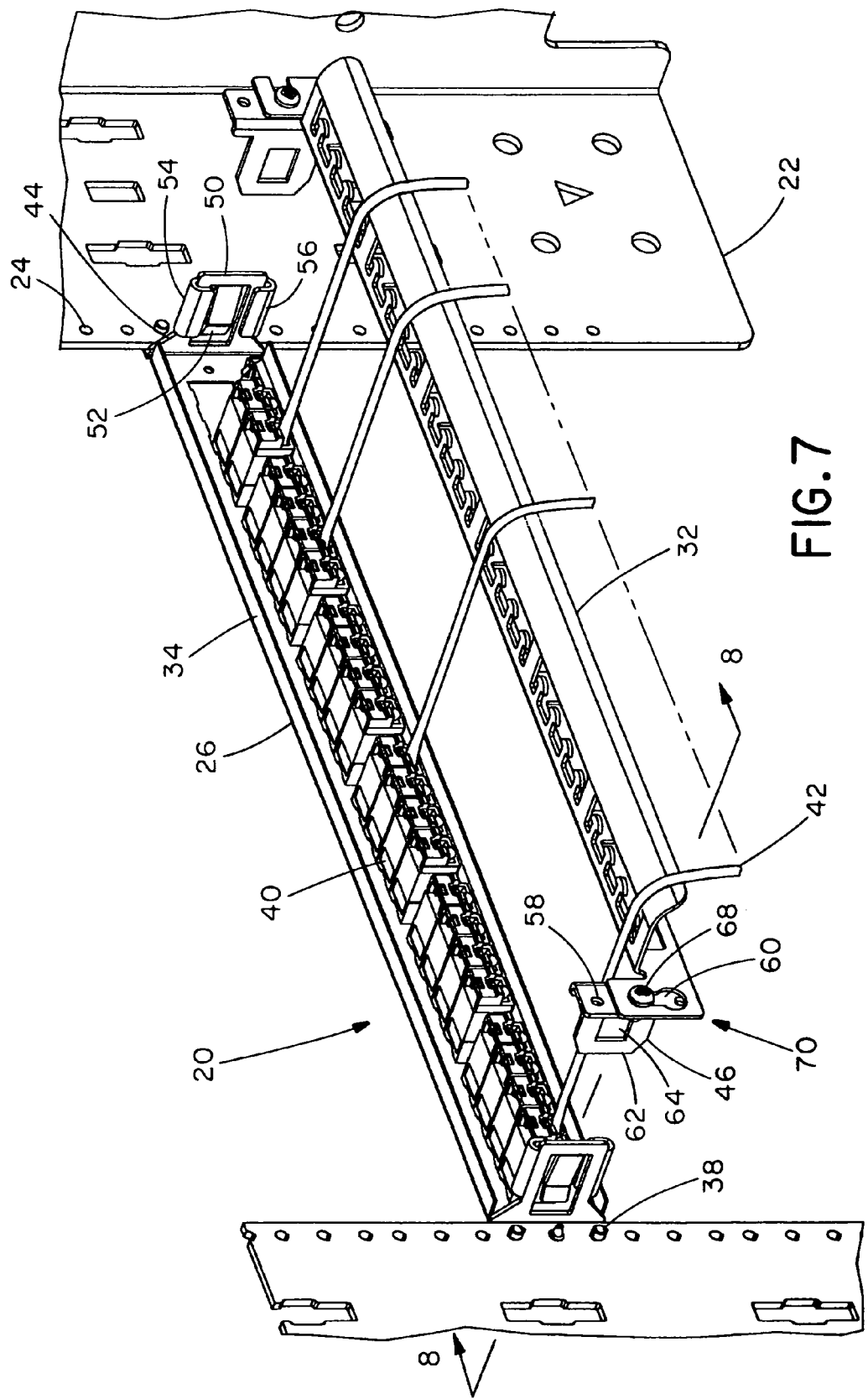
FIG. 7 is a rear perspective view of the assembly of FIG. 2, shown prior to securing the strain relief bar assembly to the patch panel.

As shown in FIGS. 5 and 6, strain relief bar assembly 70 is moved upward and positioned in alignment with latching bracket 44 (see FIGS. 7-9). As shown in FIGS. 10 and 11, strain relief bar assembly 70 is pushed into latching bracket 44, locking tab bracket 46 therein. Cantilever 52 will deflect approximately 0.03 inches when tab bracket 46 is inserted into latching bracket 44. This deflection allows for some movement or adjustment that may be needed at the front side of patch panel 26. As best seen in FIG. 11, cantilever 52 is secured within aperture 64. Moreover, rolled over edges 54, 56 entrap strain relief bar assembly 70, preventing tab bracket 46 from moving up or down when it is in a locked position. Strain relief bar assembly 70 can be removed from latching bracket 44, if necessary, using approximately 15 pounds of force.

The disclosed invention provides two quick relief brackets for removably securing a strain relief bar to a patch panel. It should be noted that the above-described illustrated embodiments and preferred embodiments of the invention are not an exhaustive listing of the form such a patch panel and strain relief bar assembly in accordance with the invention might take; rather, it serves as exemplary and illustrative of embodiments of the invention as presently understood. Many other forms of the invention are believed to exist.

The invention claimed is:

1. In combination with a patch panel and a strain relief bar, a bracket assembly comprising:
    a first bracket having a cantilever and at least two rollover edges; and
    a second bracket having a tab with an aperture,
    wherein the first bracket is connectable to one of the patch panel and the strain relief bar and the second bracket is connectable to the other of the patch panel and the strain relief bar,
    wherein the tab is adapted to slidably engage the at least two rollover edges and resiliently deflect the cantilever,
    wherein the aperture is adapted to receive at least a portion of the cantilever and removably connect the first bracket to the second bracket, thereby securing the strain relief bar to the patch panel.

2. The assembly of claim 1, wherein the first bracket is connectable to the patch panel and the second bracket is connectable to the strain relief bar.

3. The assembly of claim 1, wherein the first bracket is connectable to the strain relief bar and the second bracket is connectable to the patch panel.

4. The assembly of claim 1, wherein the aperture is adapted to receive at least a portion of the bend.

5. The assembly of claim 1, wherein the cantilever is deflectable about 0.03 inches.

6. The assembly of claim 1, wherein the first bracket and the second bracket are disconnectable using about 15 pounds of force.

7. The assembly of claim 1, wherein the first bracket and the second bracket are disconnectable using about 20 pounds of force.

8. The assembly of claim 1, wherein the first bracket and the second bracket are disconnectable using between 15 and 20 pounds of force.

9. The assembly of claim 1, wherein the cantilever has a bend.

10. The assembly of claim 9, wherein the bend is less than 90 degrees.

11. A patch panel and strain relief bar assembly comprising:
    a patch panel;
    a strain relief bar; and
    at least one bracket assembly connected to the patch panel and the strain relief bar, the at least one bracket assembly including:
        a first bracket having a cantilever and at least two rollover edges; and
        a second bracket having a tab with an aperture,
        wherein the first bracket is connected to one of the patch panel and the strain relief bar and the second bracket is connected to the other of the patch panel and the strain relief bar,
        wherein the tab slidably engages the at least two rollover edges and resiliently deflects the cantilever,
        wherein the aperture receives at least a portion of the cantilever and removably connects the first bracket to the second bracket, thereby securing the strain relief bar to the patch panel.

12. The assembly of claim 11, wherein the first bracket is connected to the patch panel and the second bracket is connected to the strain relief bar.

13. The assembly of claim 11, wherein the first bracket is connected to the strain relief bar and the second bracket is connected to the patch panel.

14. The assembly of claim 11, wherein the bend is less than 90 degrees.

15. The assembly of claim 11, wherein the cantilever is deflected about 0.03 inches.

16. The assembly of claim 11, wherein the first bracket and the second bracket are disconnectable using about 15 pounds of force.

17. The assembly of claim 11, wherein the first bracket and the second bracket are disconnectable using about 20 pounds of force.

18. The assembly of claim 11, wherein the first bracket and the second bracket are disconnectable using between 15 and 20 pounds of force.

19. The assembly of claim 11, wherein the cantilever has a bend.

20. The assembly of claim 19, wherein the aperture receives at least a portion of the bend.

* * * * *